(12) United States Patent
Blackford

(10) Patent No.: US 9,724,808 B2
(45) Date of Patent: Aug. 8, 2017

(54) ERGONOMIC FRONT FORK SERVICE TOOL

(71) Applicant: William Blackford, Kings Park, NY (US)

(72) Inventor: William Blackford, Kings Park, NY (US)

( * ) Notice: Subject to any disclaimer, the term of this patent is extended or adjusted under 35 U.S.C. 154(b) by 0 days.

(21) Appl. No.: 15/391,471

(22) Filed: Dec. 27, 2016

(65) Prior Publication Data

US 2017/0190034 A1    Jul. 6, 2017

Related U.S. Application Data

(60) Provisional application No. 62/275,082, filed on Jan. 5, 2016.

(51) Int. Cl.
| | | |
|---|---|---|
| *B25B 27/00* | (2006.01) | |
| *B25H 1/00* | (2006.01) | |
| *B25B 27/30* | (2006.01) | |
| *B62K 25/08* | (2006.01) | |

(52) U.S. Cl.
CPC ........ *B25B 27/0035* (2013.01); *B25B 27/304* (2013.01); *B25H 1/0014* (2013.01); *B62K 25/08* (2013.01)

(58) Field of Classification Search
CPC . B25B 27/0035; B25B 27/304; B25H 1/0014; B62K 25/08
See application file for complete search history.

(56) References Cited

U.S. PATENT DOCUMENTS

| | | | |
|---|---|---|---|
| 2,430,900 A | * | 11/1947 | Wetzler .................. B23Q 3/069 269/203 |
| 3,793,999 A | | 2/1974 | Seiler et al. |
| 4,708,543 A | | 11/1987 | Plutschuck et al. |
| 5,087,059 A | | 2/1992 | Terwilliger |
| 5,102,021 A | | 4/1992 | Perea |
| 5,477,598 A | | 12/1995 | Borner, Jr. |
| 6,219,896 B1 | | 4/2001 | Levy et al. |
| 8,960,062 B2 | * | 2/2015 | Chen ...................... B23D 47/04 83/452 |

FOREIGN PATENT DOCUMENTS

| | | |
|---|---|---|
| DE | 2230670 | 1/1974 |
| FR | 401769 | 9/1909 |

* cited by examiner

*Primary Examiner* — John C Hong
(74) *Attorney, Agent, or Firm* — Alfred M Walker

(57) ABSTRACT

An ergonomic front fork service tool for servicing front fork tubes of a motorcycle includes a long threaded screw engaged in a threaded housing with a swivel foot at the bottom end and a large hand knob at the top end. The threaded housing is attached to a swinging arm attached to a vertical rod support. A base bar has a hollow tube attached at a right angle a distance away from its distal end, which receives and supports the vertical rod while permitting both swinging of the arm and vertical adjustment. The position between the rod and tube is locked by fasteners threaded transversely in the top wall of the tube. A portion of the base bar is used to support the service tool in a bench vise, or to fasten to a work bench, and two swinging gate clamps engage two front fork tubes and rigidly attach them during service to the bench top vertically.

16 Claims, 4 Drawing Sheets

ERGONOMIC FRONT FORK SERVICE TOOL

RELATED APPLICATIONS

This application claims benefit and priority under 35USC 119 (e) from provisional application Ser. No. 62/275,082 filed Jan. 5, 2016. The '082 application is incorporated by reference herein.

FIELD OF THE INVENTION

The present invention relates to a tool for servicing front forks of a motorcycle.

BACKGROUND OF THE INVENTION

The purpose of this tool is to safely facilitate the servicing of the hydraulic front forks on most American V-Twin motorcycles.

The inventor having rebuilt numerous front ends to service, add chrome lowers, or tune the front end with optional springs has found the process cumbersome, frustrating, and potentially dangerous. Removing or installing the fork caps was particularly challenging posing the potential of cross threading and/or damage. This servicing also posed a safety hazard in the cap flying off as it is under spring pressure. Also noted was the potential for saving significant time in the process by using the features of this tool.

The prior art reveals several related patents. The German patent of Woitzik (DE2230670) shows a tool for setting the valve clearance for internal combustion engines. The tool combines the adjusting spanner with the locking nut spanner in a single tool to be used with two hands. It is not related to servicing of motorcycle front forks. The French patent of Nolte (FR401769) relates to a tool using a cam and a matching thread pitch on the tool to screw or unscrew a nut from a bolt. It also is not related to the servicing of motorcycle forks. Other than the use of threaded rod to apply or release pressure, Nolte (FR401769) is very complex and appears to be designed to be used in a repetitive process to apply equal pressure to fasten or remove bolts, rivets etc, as in tamper proof hardware. The cam device, interchangeable threaded sleeves, and various adapters make this expensive and cumbersome and not useful in servicing front fork tubes of a motorcycle.

The patent of Borner, Jr. (U.S. Pat. No. 5,477,598) is for a cap and spring installation and removal tool for use in servicing motorcycle forks. It has some similarities to the present invention, such as incorporating a threaded shaft and aiding in the safe removal and installation of a spring tube cap. However, Borner, Jr. uses a yoke engaging a top flange in the tube housing to function. Such a step in the spring housing to engage a tool yoke has not been a feature of conventional contemporary motorcycles for some time thereby making Mr. Borner's tool design non-functional on most of today's street motorcycles. The tool described by Borner's patent handles one fork tube at a time and has no convenient means of mounting to a bench top; it is also more expensive to manufacture and not as intuitive to use as the present invention.

OBJECTS OF THE INVENTION

It is therefore an object of the present invention to safely facilitate the servicing of the hydraulic front forks on most American V-Twin motorcycles.

It is also an object of the present invention to provide a front fork servicing tool which prevents damage to chrome fork tubes of a motorcycle during servicing, and to safely and conveniently mount both front fork tubes to a bench top.

It is also an object to provide a front fork servicing tool, which can safely release and install a fork tube cap under pressure from the forces of internal compression springs in the front fork tubes.

Other objects will become apparent from the following description of the present invention.

SUMMARY OF THE INVENTION

The ergonomic front fork service tool of this invention incorporates a long threaded screw engaged in a threaded housing with a swivel foot at the bottom end and a large hand knob at the top end. The threaded housing is attached to a swinging arm rigidly attached (as by welding) to a vertical rod support. A base bar has a hollow tube attached at a right angle a distance away from its distal end. This tube receives and supports the vertical rod while permitting both swinging of the arm and some vertical adjustment; the position between rod and tube is locked by one or more thumb screws threaded transversally in the top wall of the tube.

While the distal portion of the base bar beyond the vertical tube attachment is used to support the service tool in a bench vise, the forward extension supports two swinging gate clamps at the distal end which are used to engage two front fork tubes of a variety of sizes thereby rigidly attaching them during service to the bench top in a vertical orientation. To prevent marring of the tubes which are typically finely polished stainless steel or chrome plated, the inside surfaces of the two swinging gate clamps are lined with a layer of rubber, polyurethane, thermoplastic elastomer or the like. The length of the swinging arm is such as to permit the positioning of the swivel foot atop the center of either swinging gate clamp, or the entire screw subassembly can be swung back away from the engaged fork tubes or quickly removed when not needed.

Some of the benefits of this tool are as follows:

The tool will hold both front forks at the same time, therefore reducing time to service.

Each tube can be slid up easily in a loosened clamp for convenience to remove both screws (typically 6 mm) from bottom of both forks in the same location.

Oil can be drained from both forks simultaneously into a suitable container.

The fork tube caps, which are under spring pressure, can be removed and installed in a safe, quick and controlled manner.

This tool can also act as a vice, designed to protect the machined surface of the fork tube from marring as the service and/or rebuilding process takes place, and to hold the fork tube in place, while servicing forks, changing seals, adding chrome lowers etc.

This tool can handle all common fork tube diameters.

This tool can be used in a bench vice, or it can be clamped or permanently bolted to a conventional work bench.

An additional benefit to this tool is that after the cap and spring are removed, the fork tubes and lower chrome legs are now safely held in the device, and additional servicing can take place such as seal removal and/or replacement of lower legs.

In detail, the ergonomic motorcycle front fork service tool includes:

a) a long threaded screw engaged in a threaded housing with a swivel foot at a bottom end and a large hand knob at a top end;

b) the aforementioned threaded housing being attached to a swinging arm attached to a vertical rod support;

c) a base bar having a hollow tube attached at a right angle a predetermined distance away from a distal end thereof; which receives and supports the vertical rod while permitting both swinging of swinging arm and vertical adjustment thereof;

d) wherein a position between the vertical rod and the hollow tube is locked by fasteners threaded transversally in a top wall of the hollow tube; and, e) wherein further a portion of the base bar supports the service tool in a bench vise, and a pair of swinging gate clamps engage the pair of front fork tubes, rigidly attaching the front fork tubes, during service, to the bench top vertically.

The aforementioned swinging gate clamps are mounted on opposite sides of the aforementioned base bar, wherein the clamps are aligned with a pair of spaced hydraulic front fork tubes. Optionally, each gate clamp includes a stationary portion attached to one side of the base bar, and a pivoted swinging portion for enclosing the front fork tube being serviced. Each swinging gate clamp also may include a tightening element for locking the swinging gate portion into engagement with the aforesaid front fork tube being serviced. For example, the tightening elements can have many configurations, and may be a threaded element and nut or wing nut for engaging a portion of the swinging gate portion when fully enclosing the front fork tube being serviced.

As a result, the tool may be used in combination with, and for servicing, a pair of motorcycle hydraulic front fork tubes, wherein each of the aforesaid front fork tubes has a top opening with a threaded cap enclosing the top opening, wherein further the front fork tubes each contain a spring held in compression by the aforementioned threaded cap. In this combination, the front fork tubes are filled with hydraulic fluid; and the tool includes the base bar held in a bench vise for servicing the front fork tubes. A pair of gate clamps are mounted on opposite sides of the base bar for locking onto both of the front fork tubes simultaneously, and a pivoting structure engages each of the threaded caps in succession for allowing releasing and mounting of these threaded caps, while permitting controlled expansion and compression of the springs within each of the front fork tubes, to safely release and install each threaded cap under pressure from the forces of the internal compression springs within the front fork tubes. Preferably, the aforesaid pivoting structure includes a telescoping assembly mounted on the base bar to support a threaded housing, which swivels between alignment with each of the front fork tubes. The threaded housing preferably contains a threaded screw having a foot at a lower end thereof to engage each of the aforementioned threaded caps, while allowing a wrench to engage the threaded caps to release from, or mount to, the aforesaid front fork tubes.

Each of the aforementioned gate clamp includes a stationary portion attached to one side of the base bar, and a pivoted swinging portion for enclosing a front fork tube. Each swinging gate clamp may includes a tightening element for locking the swinging gate portion into engagement with the front fork tube being serviced. Optionally, the tightening element includes a threaded element and nut that engages a portion of the swinging gate portion when fully enclosing the front fork tube being serviced.

The present invention also includes a method of servicing a pair of motorcycle hydraulic front fork tubes comprising the steps of:

a) providing each of the front fork tubes having a top opening with a threaded cap enclosing the top opening, the front fork tubes each containing a spring held in compression by the threaded cap, the front fork tubes being filled with hydraulic fluid; and b) providing a tool comprising a base bar held in a bench vise for servicing the front fork tubes, a pair of gate clamps mounted on opposite sides of the base bar for locking onto both of the front fork tubes simultaneously, and pivoting structure for engaging each of the threaded caps in succession for allowing releasing and mounting of the threaded caps while permitting controlled expansion and compression of the springs within the front fork tubes to safely release and install each threaded cap under pressure from the forces of the internal compression springs within the front fork tubes.

In the aforementioned method, there are the further steps of providing the pivoting structure with a telescoping assembly mounted on the base bar and supporting the threaded housing, which swivels between alignment with each of the front fork tubes, wherein the threaded housing contains a threaded screw having a foot at a lower end thereof for engaging each of the threaded caps, and thereafter allowing a wrench to either release or engage each respective threaded cap from, or to, the respective front fork tubes.

The method preferably also includes the step of attaching a stationary portion to one side of the base bar associated with each gate clamp. and enclosing each of the front fork tubes. with a pivoted swinging portion.

The method also optionally includes the step of providing each swinging gate clamp with a tightening element, such as, for example, a threaded element and a nut, which is used for locking the swinging gate portion into engagement with each of the front fork tubes, when fully enclosing each front fork tube being serviced.

BRIEF DESCRIPTION OF THE DRAWINGS

The present invention can best be understood in connection with the accompanying drawings. It is noted that the invention is not limited to the precise embodiments shown in drawings, in which.

DETAILED DESCRIPTION OF THE INVENTION

Figure 1:
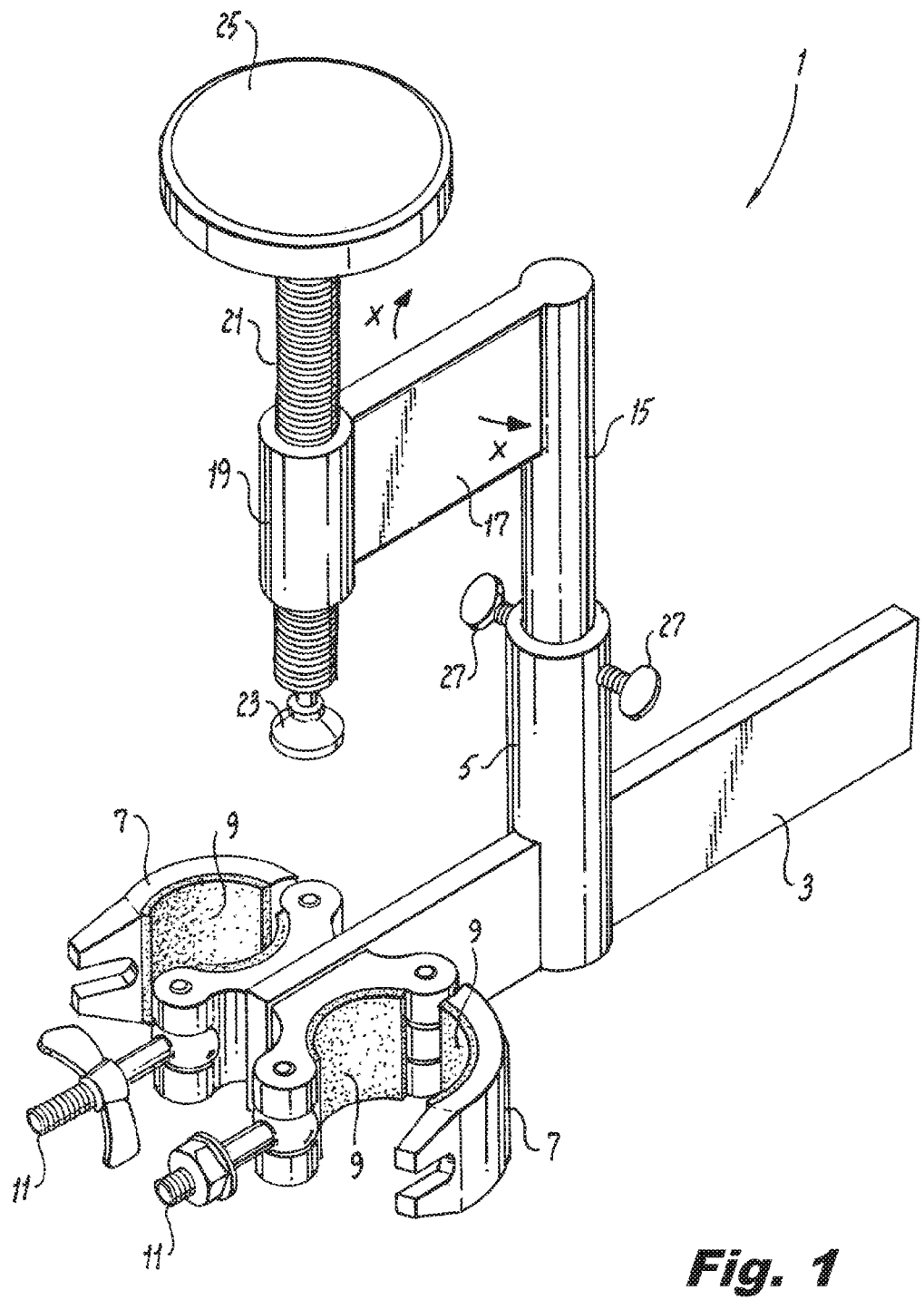
FIG. 1 is a perspective view of the ergonomic front fork service tool of this invention.
Figure 2:
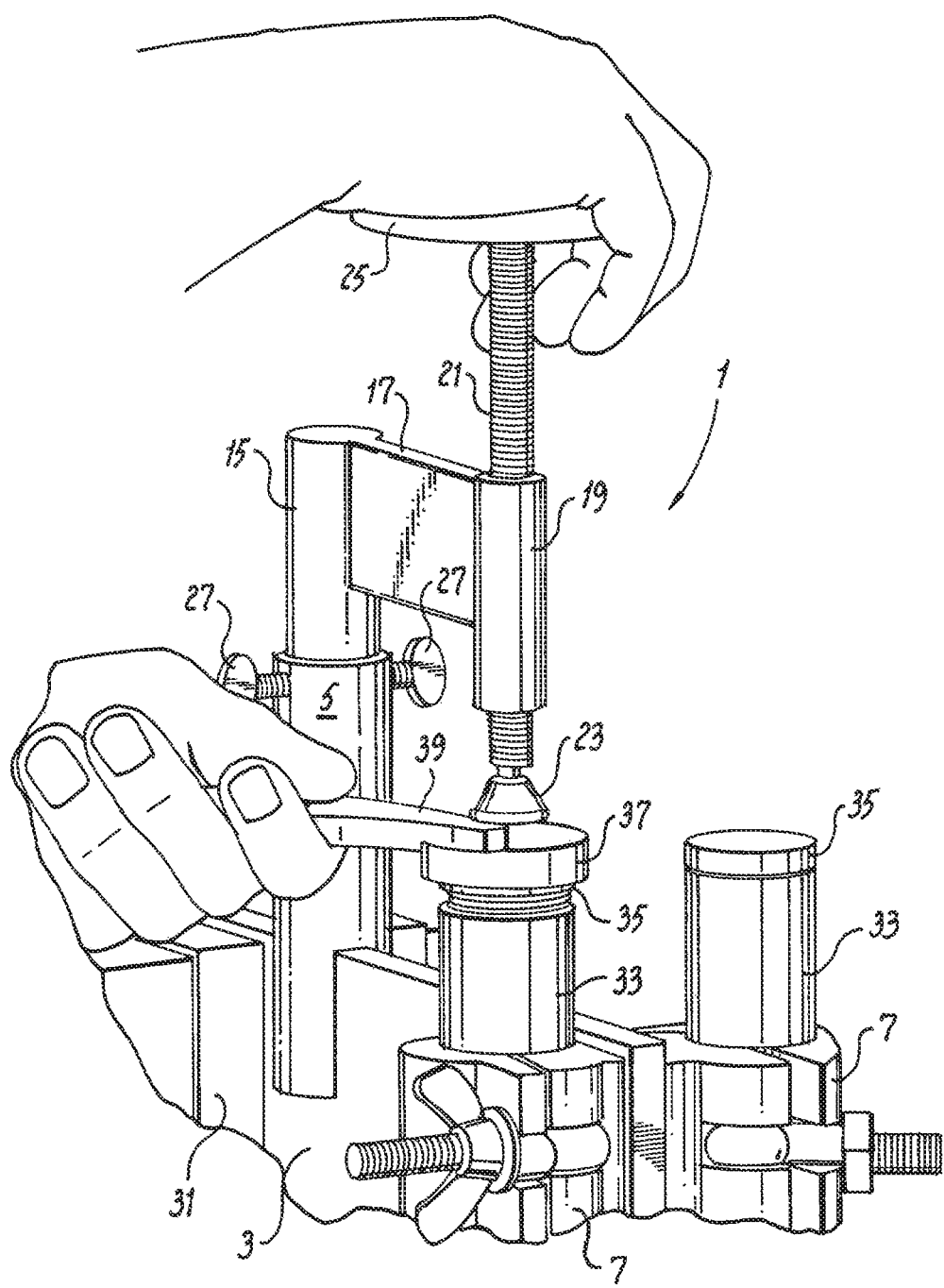
FIG. 2 is a perspective view of the service tool being used to remove a fork tube cap.

The various parts of the ergonomic front fork service tool 1 can be identified in FIG. 1. Base bar 3 supports tool 1. Distal tail end (of bar 3) past support tube 5 is typically engaged in a bench vice. The forward end of bar 3 is attached to two swinging gate clamps 7 with fasteners, such a locking eyebolts and nuts 11. Since clamps 7 can use either a wing nut or a hex nut as the tightening element 11, one of each type is illustrated in FIGS. 1 and 2. The inside surface 9 of both clamps 7 is lined with a layer of rubber or a similar non-marring material. Long screw 21 is engaged in threaded housing 19; screw 21 preferably has a large hand knob 25 at its top end and a swiveling foot 23 with a flat bottom at its lower end. Swinging arm 17 attaches housing 19 to column 15. Two thumb screws 27 are shown to lock column 15 in its desired position for the task at hand. Note that arm 17 can be swung in registration with the center of either swinging gate clamp 7 or totally to the rear (out of the way or removed if needed) if the current task does not involve use of screw 21 as illustrated by path X-X.

FIG. 2 shows tool 1 (held in vice 31) in use removing fork tube cap 35 from the fork tube 33 on the left. Fork cap wrench (sometimes called a cap socket wrench) 37 is engaged with fork tube cap 35. In this illustration, cap 35 has been previously loosened by rotation of about one or two threads, using a cap socket and wrench, prior to swinging the device in place, to aid in safely removing the fork tube cap 35.

At the instant shown, an adjustable wrench 39 is used in conjunction with fork cap socket wrench, to further loosen cap 35 via cap wrench 37 while knob 25 is used to loosen foot 23 from hard contact with wrench 37 while the bottom hand is then used either with wrench 39, or directly on cap wrench 37, simultaneously turning until fork cap 35 is completely unthreaded. As a result, the operator can work both hands, simultaneously, loosening and/or tightening, to remove or install the spring or cap 35. At that point, foot 23 via screw 21 takes the preload of the spring within, preventing cap 35 and/or cap wrench 37 from becoming airborne. Further loosening of screw 21 using knob 25 keeps foot 23 in contact with cap wrench 37. Further turning of knob 25 will release foot 23 from contact with cap wrench 37 eventually permitting removal of cap 35 and cap wrench 37 as the gap increases; at this point the end of the spring within is exposed. The process to reattach fork cap 35 is the reverse starting with compressing the preload length of the spring through contact with fork tube 33 and carefully engaging the cap threads. Adjustable wrench 39 and fork cap socket wrench 37 are not part of tool 1; they are user supplied in a variety of types and sizes to fit different fork styles.

Figure 3A:
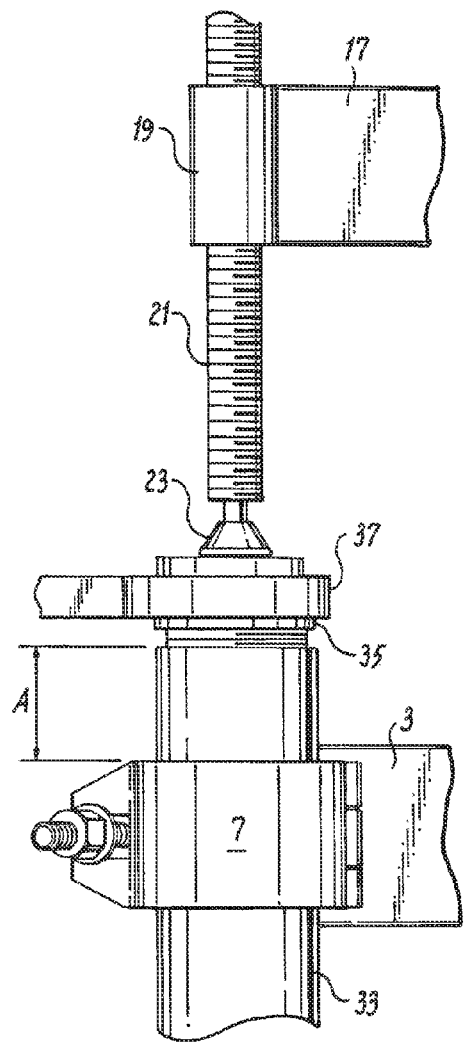
FIG. 3A is a side elevation schematic detail showing the position of the long screw while engaging the fork tube cap.
Figure 3B:
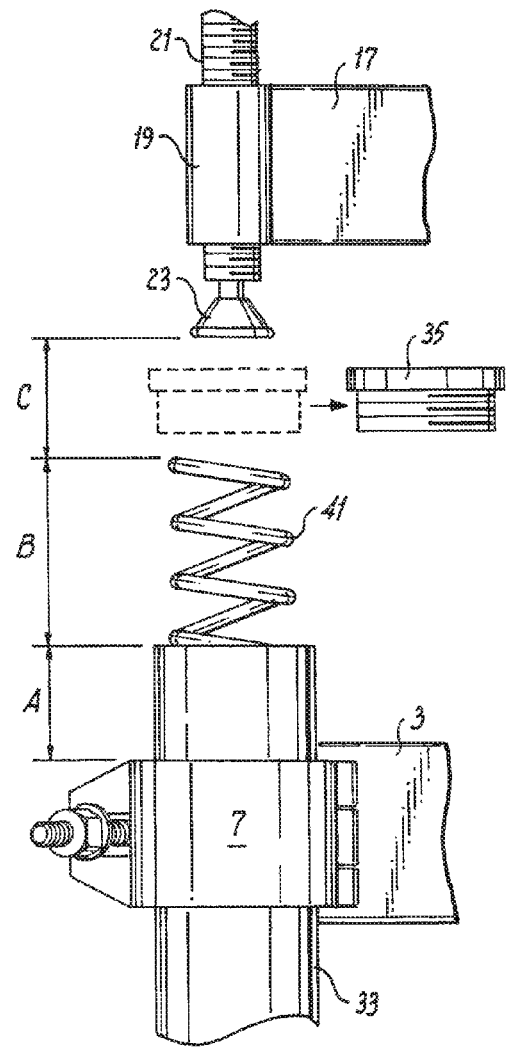
FIG. 3B is a side elevation schematic detail showing the position of the long screw and spring preload emanating from the top of the fork tube after the fork cap is removed.

FIGS. 3A and 3B illustrate the position of screw 21 at the beginning and end of the procedure of FIG. 2. In 3A fork cap 35 is still threaded inside tube 33 and foot 23 is just in contact with the top of cap wrench 37. Distance A, the clamping position of tube 33, is selected with respect to the excursion of screw 21 below screw housing 19 and the expected preload length B of spring 41 within a shown in 3B. After cap 35 is unscrewed from tube 33, further movement of screw 21 upwards creates gap C permitting removal of cap 35 and cap wrench 37 with no spring force.

Figure 4:
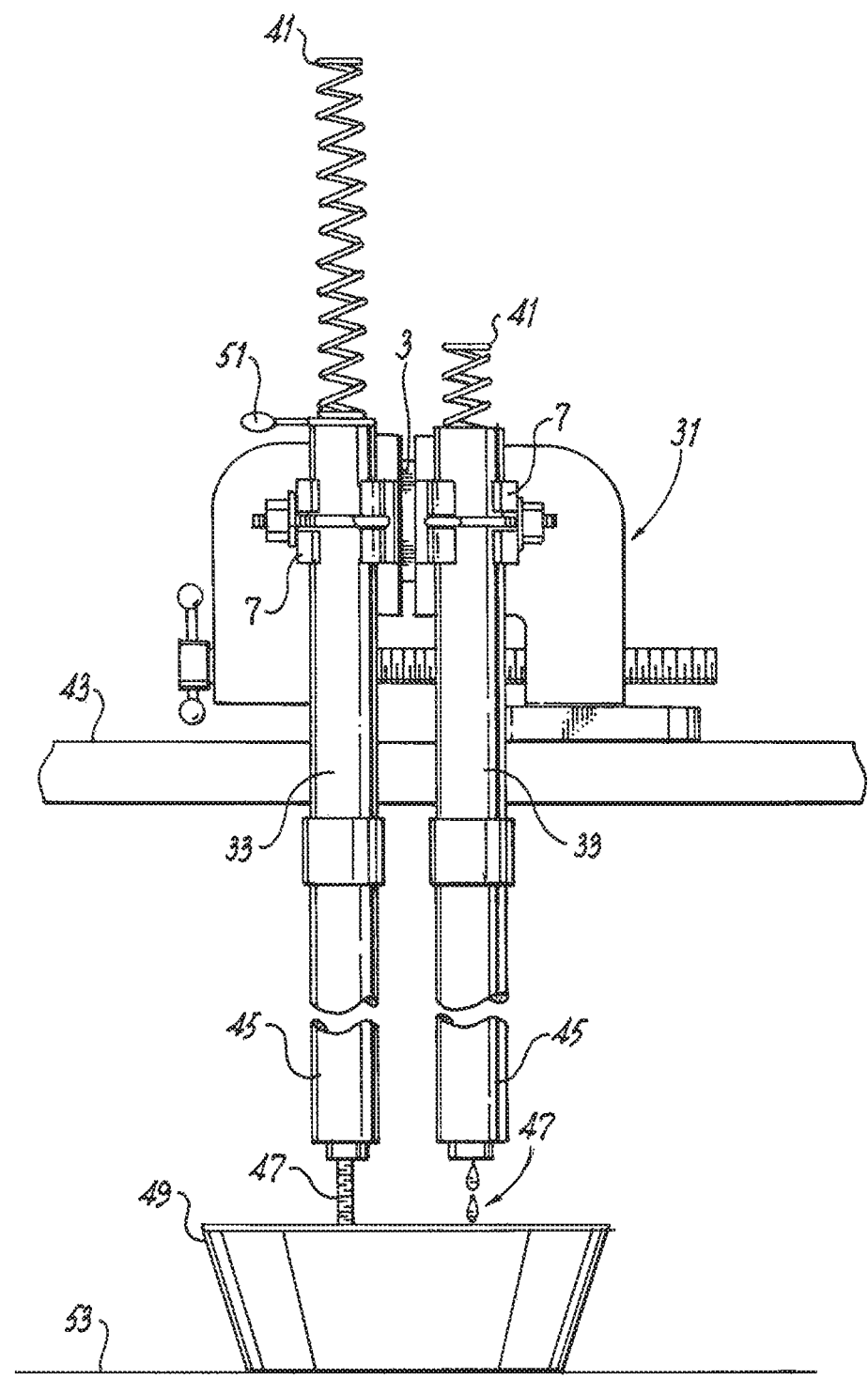
FIG. 4 is a side elevation schematic showing the relation of two fork tubes supported by the service tool during draining of oil from both tubes simultaneously.

FIG. 4 illustrates the use of tool 1 in the oil draining task. Since the upper screw assembly is not needed for this task, it is not shown (in fact, it can easily be lifted and removed by loosening thumb screws 27). Bench vice 31 supports tool 1 by engaging base bar 3 in its jaws. Two fork tubes 33 are engaged in clamps 7 with the lower portions 45 hanging below bench top 43. A receptacle for draining oil 49 is placed on floor 53 in a suitable place to receive oil streams and drips 47. In the right tube 33, spring 41 is fully down showing just its preload extension above tube 33. In the left fork tube 33, spring 41 has been lifted out a certain distance and supported on a tool 51 to permit oil to drain from it. This illustration also demonstrates that after the cap 35 and spring 41 have been removed and the oil drained, additional service work can be performed while being held by this device (tool 1). This includes seal removal/replacement and the removal of lower fork legs 45. Lower legs 45 are often replaced to upgrade to chrome to dress up a motorcycle. After oil is drained, forks can be adjusted to raise them in the clamps to make it more comfortable and convenient to perform required tasks.

Front fork service tool 1 is ergonomically designed to service two front forks together in a clean environment. Tool 1 operation is intuitive from its appearance and no extensive training is required to take advantage of its features by technicians familiar with motorcycle service procedures.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention.

I claim:

1. An ergonomic motorcycle front fork service tool comprising:
   a long threaded screw engaged in a threaded housing with a swivel foot at a bottom end and a large hand knob at a top end;
   said threaded housing being attached to a swinging arm attached to a vertical rod support;
   a base bar having a hollow tube attached at a right angle a predetermined distance away from a distal end thereof, which receives and supports said vertical rod while permitting both swinging of swinging arm and vertical adjustment thereof;
   wherein a position between said vertical rod and said hollow tube is locked by fasteners threaded transversally in a top wall of said hollow tube;
   wherein further a portion of said base bar supports said service tool in a bench vise, or attached directly to a work bench, and a pair of swinging gate clamps engage a pair of motorcycle front fork tubes, rigidly attaching said motorcycle front fork tubes, during service, to said bench top vertically.

2. The service tool of claim 1 in which said swinging gate clamps are mounted on opposite sides of said base bar, said gate clamps being aligned with a pair of spaced hydraulic front fork tubes.

3. The service tool of claim 2 in which each said gate clamp comprises a stationary portion attached to one side of said base bar, and a pivoted swinging portion for enclosing a front fork tube.

4. The service tool of claim 3 in which each swinging gate clamp includes a tightening element for locking said swinging gate portion into engagement with said front fork tube.

5. The service tool of claim 4 in which said tightening element comprises a threaded element and nut for engaging a portion of said swinging gate portion when fully enclosing said front fork tube.

6. The service tube of claim 5 further comprising a pivoting structure engaging a respective threaded cap, of each fork tube, thereby permitting controlled expansion and compressing of each coil spring of each respective fork tube, to safely release and install each threaded cap under pressure on top of each respective fork tube.

7. A tool in combination with, and for servicing, a pair of motorcycle hydraulic front fork tubes comprising:

each of said front fork tubes having a top opening with a threaded cap enclosing said top opening, said front fork tubes containing a spring held in compression by said threaded cap, and said front fork tubes being filled with hydraulic fluid; and;

said tool comprising a base bar held in a bench vise, or attached directly to a work bench, for servicing said font fork tubes, a pair of gate clamps mounted on opposite sides of said base bar for locking onto both of said front fork tubes simultaneously, and pivoting structure for engaging each of said threaded caps in succession for allowing releasing and mounting of said threaded caps while permitting controlled expansion and compression of said springs within said front fork tubes to safely release and install each threaded cap under pressure from respective forces of respective internal compression springs within said front fork tubes.

8. The combination of claim 7 in which said pivoting structure comprises a telescoping assembly mounted on said base bar for supporting a threaded housing which swivels between alignment with each of said front fork tubes, said threaded housing containing a threaded screw having a foot at a lower end thereof for engaging each of said threaded caps while allowing a wrench to engage said threaded cape to release from or mount to said front fork tubes.

9. The combination of claim 8 in which each said gate clamp comprises a stationary portion attached to one side of said base bar, and a pivoted swinging portion for enclosing a front fork tube.

10. The combination of claim 9 in which each swinging gate clamp includes a tightening element for locking said swinging gate portion into engagement with said front fork tube.

11. The combination of claim 10 in which said tightening element comprises a threaded element and nut for engaging a portion of said swinging gate portion when fully enclosing said front fork tube.

12. A method of servicing a pair of motorcycle hydraulic front fork tubes comprising the steps of:

providing each of said front fork tubes having a top opening with a threaded cap enclosing said top opening, said front fork tubes each containing a spring held in compression by said threaded cap, said front fork tubes being filled with hydraulic fluid; and providing a tool comprising a base bar held in a bench vise, or attached directly to a work bench, for servicing said front fork tubes, a pair of gate clamps mounted on opposite sides of said base bar for locking onto both of said front fork tubes simultaneously, and pivoting structure for engaging each of said threaded caps in succession for allowing releasing and mounting of said threaded caps while permitting controlled expansion and compression of said springs within said front fork tubes to safely release and install each threaded cap under pressure from respective forces of respective internal compression springs within said front fork tubes;

releasing each said threaded cap and exposing an interior of each said front fork tube;

releasing any bottom fasteners from each said front fork tube for draining fluid therethrough;

servicing each said front fork tube;

re-installing said bottom fasteners and said threaded caps on said respective front fork tubes; and removing said front fork tubes from said tool.

13. The method of claim 12 in which said pivoting structure comprises a telescoping assembly mounted on said base bar for supporting a threaded housing which swivels between alignment with each of said front fork tubes, said threaded housing containing a threaded screw having a foot at a lower end thereof for engaging each of said threaded caps while allowing a wrench to either release or engage each said threaded cap from or to said front fork tubes.

14. The method of claim 13 in which each said gate clamp comprises a stationary portion attached to one side of said base bar, and a pivoted swinging portion for enclosing each of said front fork tubes.

15. The method of claim 14 in which each swinging gate clamp includes a tightening element for locking said swinging gate portion into engagement with each of said front fork tubes.

16. The method of claim 15 in which said tightening element comprises a threaded element and nut for engaging a portion of said swinging gate portion when fully enclosing each said front fork tube.

* * * * *